(12) United States Patent
Walters et al.

(10) Patent No.: US 7,618,698 B2
(45) Date of Patent: Nov. 17, 2009

(54) DAMAGE PROTECTION DEVICE FOR AIRCRAFT STRUCTURE

(75) Inventors: Kevin D. Walters, St. Charles, MO (US); Travis T. Marshall, St. Peters, MO (US)

(73) Assignee: The Boeing Company, Chicago, IL (US)

( * ) Notice: Subject to any disclaimer, the term of this patent is extended or adjusted under 35 U.S.C. 154(b) by 319 days.

(21) Appl. No.: 11/697,640

(22) Filed: Apr. 6, 2007

(65) Prior Publication Data

US 2008/0248234 A1 Oct. 9, 2008

(51) Int. Cl.
*B32B 1/00* (2006.01)

(52) U.S. Cl. .................. 428/99; 428/122; 248/345.1

(58) Field of Classification Search ............. 428/99, 428/122; 248/345.1
See application file for complete search history.

(56) References Cited

U.S. PATENT DOCUMENTS

| 6,019,336 A * | 2/2000 | Havens ............... 248/345.1 |
| 2006/0080796 A1 * | 4/2006 | Cotto ................. 15/167.3 |
| 2006/0207486 A1 * | 9/2006 | Ayoub ................ 114/219 |

* cited by examiner

*Primary Examiner*—Alexander Thomas

(57) ABSTRACT

An apparatus to protect exposed structures on an aircraft which includes a core; a securing mechanism coupled to the core; and an outer coating applied to the core to encapsulate the core and facilitate the attachment of the securing mechanism. A thermal protection layer may be applied to the apparatus for high temperature applications.

17 Claims, 2 Drawing Sheets

DAMAGE PROTECTION DEVICE FOR AIRCRAFT STRUCTURE

THIS INVENTION WAS MADE WITH GOVERNMENT SUPPORT UNDER CONTRACT NO. MDA972-99-9-0003 AWARDED BY THE NAVY UNMANNED COMBAT AIR SYSTEM (NAVY UCAS). THE GOVERNMENT HAS CERTAIN RIGHTS IN THIS INVENTION.

BACKGROUND

1. Field of the Invention

The present invention relates to a protection device, and in particular to a device used to protect surfaces and structures on or related to an aircraft.

2. Related Art

Leading and trailing edge structures, as well as flight control surfaces, on high performance aircraft are designed to be very lightweight. Typically, these structures have skins as thin as 0.030" thick, fabricated from aluminum or composite materials, and generally stiffened with very lightweight honeycomb internal core materials.

As a result, these structures are not robust beyond surviving in-flight air loadings. Maintenance to these aircraft structures are typically performed daily on the upper surfaces, so for access to the top of the aircraft, maintenance stands or ladders are positioned around the perimeter, resulting in induced damage in the form of dents, gouges, or delaminations.

Currently, some maintenance facilities apply padding to work-stands, ladders and the like, however, the typical padding used is not always positioned properly (height) and is not substantial enough to resist the typical impacts experienced during routine maintenance operations.

What is needed is an apparatus suitable for protecting exposed surfaces and structures on an aircraft, which is simple to make, lightweight and low cost.

SUMMARY

In light of the foregoing background, an improved apparatus for protecting an aircraft structure, such as a composite structure, is provided according to the various embodiments of the present invention.

In one aspect, an apparatus is provided to protect exposed structures on an aircraft which includes a core; a securing mechanism coupled to the core; and an outer coating applied to the core to encapsulate the core and facilitate the attachment of the securing mechanism.

In another aspect, an apparatus is provided to protect exposed structures on an aircraft. The apparatus includes an impact absorbing elastomeric foam body and a tab and suction cup assembly coupled to the impact absorbing elastomeric foam body. An outer coating may be applied to the impact absorbing elastomeric foam body to encapsulate the impact absorbing elastomeric foam body and facilitate the attachment of the tab thereto.

In yet another aspect of the invention an apparatus to protect exposed structures on an aircraft is provided which includes an impact absorbing elastomeric foam body; a magnetic material; and an outer coating applied to the impact absorbing elastomeric foam body to encapsulate the impact absorbing elastomeric foam body and to embed the magnetic material therein.

The present invention is an apparatus which may be used to protect fragile structures on any aircraft surface during maintenance or storage, and may also be used to protect shipped or transported sub-assemblies and spare parts. A thermal protection layer may be applied to the apparatus for high temperature applications.

The apparatus is simple, low cost, and easily adapted to use with various shapes and in multiple applications, and is especially beneficial for protecting composite structures.

The apparatus may be used by any aircraft operator, commercial or military, US or foreign.

Additional advantages, objects, and features of the invention will be set forth in part in the detailed description which follows. It is to be understood that both the foregoing general description and the following detailed description are merely exemplary of the invention, and are intended to provide an over-view or framework for understanding the nature and character of the invention as it is claimed.

BRIEF DESCRIPTION OF THE DRAWINGS

Figure 1:
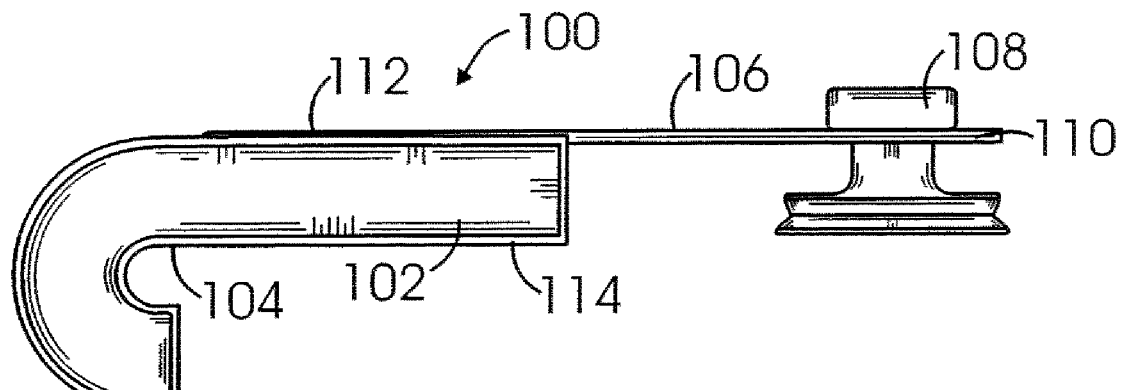
Figure 2:
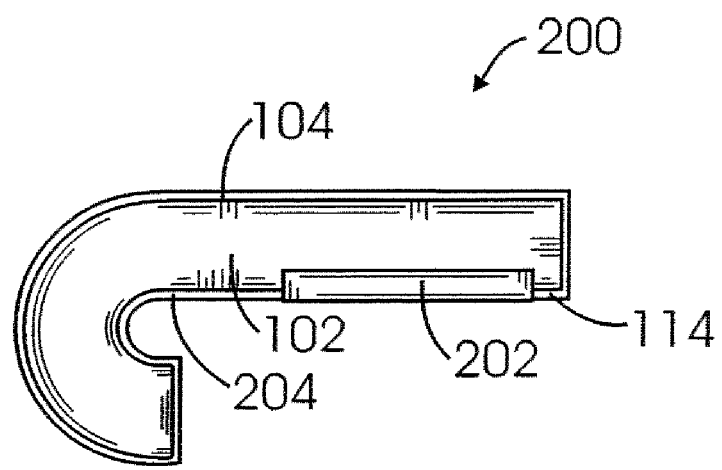
Figure 3:
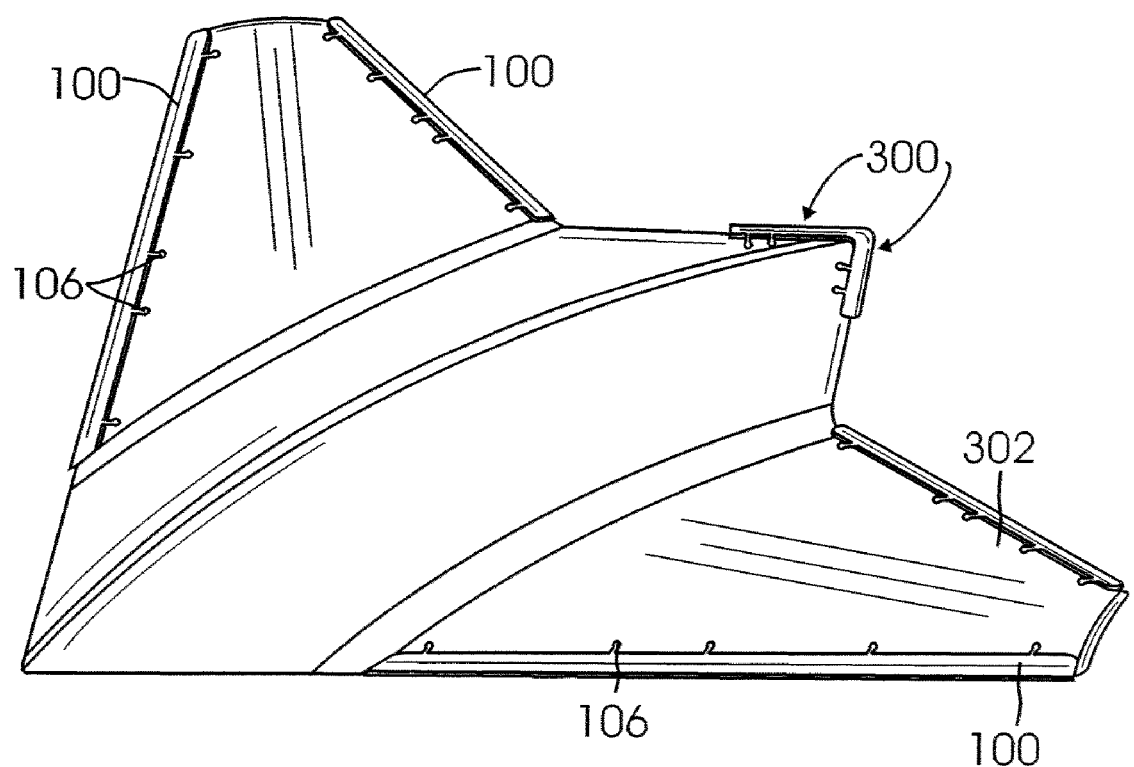

Having thus described the invention in general terms, reference will now be made to the accompanying drawings, which are not necessarily drawn to scale, and wherein:

FIG. 1 is a simplified cross-sectional view of a protection device in accordance with an embodiment;

FIG. 2 is a simplified cross-sectional view of a protection device in accordance with another embodiment; and FIG. 3 is a simplified perspective view of an aircraft having the protection device of FIG. 1 applied thereto in accordance with an embodiment.

DETAILED DESCRIPTION

The disclosure now will be described more fully hereinafter with reference to the accompanying drawings, in which some, but not all embodiments are shown. The disclosure may be embodied in many different forms and should not be construed as limited to the embodiments set forth herein. Like numbers refer to like elements throughout.

FIG. 1 is a cross-sectional view of a protection device 100 designed to protect the relatively fragile edges and flight control surfaces of an aircraft structure from maintenance-induced damage, such as work stand impacts, dropped tools, and walking or kneeling on the aircraft structures.

In one embodiment, protection device 100 includes a core 102, an outer coating 104, and flaps or tabs 106 for accommodating a securing mechanism 108.

In this embodiment, core 102 includes an impact-absorbing elastomeric body 102, made from, for example, ethylene vinyl acetate (EVA), urethane foam, or an equivalent material.

In one embodiment, core 102 is a thermoformed EVA foam body. Beneficially, manufacturing core 102 from the thermoformed EVA foam allows protection device 100 to be shaped to accommodate various structures and surfaces. For example, core 102 made from thermoformed EVA foam can be heat treated and placed upon a tool simulating the shape of the structure requiring protection. For example, as illustrated in FIG. 1, core 102 of protection device 100 may be formed in a "hook" or "J-shape" for use in a typical leading or trailing edge of an aircraft wing application.

A thermoformed EVA foam body of the type suitable for use in protection device 100 is available commercially as EVA Foam Part #9115 from Vulcan Corporation, Clarksville, Tenn.

Core 102 may be of a constant or variable thickness or, alternatively, may be tailored so as to conform to the shape of the structure requiring protection. In one embodiment, core 102 may range in thickness from between about 0.25" to about 2", for example, 1". Core 102 may be purchased in sheet stock, and may be of a density ranging from between about 3 lb density to about 10 lb density, for example, 6 lb density.

Referring again to FIG. 1, protection device 100 is fabricated with outer coating 104. In one embodiment, outer coating 104 includes an elastomeric skin made of urethane or similar material. Outer coating 104 may be applied to core 102 in any conventional manner, such as using a spraying process, to encapsulate core 102. In one embodiment, outer coating 104 is applied to core 102 to achieve a thickness of between about 0.01" and about 0.2", for example, 0.1".

Outer coating 104 provides an increased level of impact resistance to protection device 100. For example, the combination of core 102 and outer coating 104 has been shown to maximize impact resistance to greater than 25 ft-lbs when tested in an impact facility on a representative aircraft wing edge structure.

In addition, outer coating 104 fixes and establishes the shape of core 102 by prohibiting core 102 from relaxing or changing shape when exposed to heat after core 102 has been shaped.

An outer coating of the type suitable for use in protection device 100 is commercially available as a two part urethane, SP-82, from BJB Enterprises, Inc., Tustin, Calif.

In one embodiment, outer coating 104 may be tinted, for example, with red or yellow pigment so as to provide a greater level of safety for users traversing in the vicinity of protection device 100 and to ensure visual notice for removal prior to flight. One such pigment is 6141 pigment—Red, available from BJB Enterprises, Inc.

In one embodiment, tabs or flaps 106 are used to accommodate securing mechanism 108, which is used to fasten protection device 100 to the aircraft structure. Securing mechanism 108 may be any suitable means for causing protection device 100 to be attached to the aircraft structure. As shown in FIG. 1, securing mechanism 108 is a suction cup that is attached to a first end 110 of tab 106. The suction cup operates in a well known manner to secure itself to the aircraft structure causing protection device 100 to remain in position (See FIG. 3). An exemplary type of suction cup for use in protection device 100 is available from All Vac Industries Inc., of Skokie, Ill.

In one alternative embodiment, securing mechanism 108 may be a magnetic structure which adheres to ferrous structures or coatings on the aircraft surface.

In another alternative embodiment, securing mechanism 108 may include an elastic cord that is attached at one end of the elastic cord to first end 110 and at a second end to a surface feature found on the aircraft.

Securing mechanism 108 may also include a pin that may be inserted into a hole at first end 110 and made to attach to a corresponding hole designed to receive the pin, strategically positioned on the aircraft surface.

Second end 112 of tab 106 is secured to core 102. In this embodiment, second end 112 is secured to core 102 using, for example, an adhesive, such as URALANE 5773, a urethane adhesive available from Huntsman, Los Angeles, Calif. Subsequently, when outer coating 104 is applied to core 102, it also acts to secure second end 112 of tab 106 to core 102.

FIG. 2 is a cross sectional illustration of another embodiment of a protection device 200. Protection device 200 includes core 102 and outer coating 104, but uses a different means for coupling protection device 200 to the aircraft structure.

In this embodiment, a magnetic material 202, which may be a plurality of individual magnetic structures or, alternatively, a sheet of magnetic material, is embedded under outer coating 104 proximate to the internal surface 204 of protection device 200. Magnetic material 202 may be hermetically sealed, for example, by coating magnetic material 202 with a coating of primer, such as DEFT 44-GN-72 A/B, to environmentally protect the magnetic material.

In operation, as the internal surface 204 of protection device 200 is brought into contact with the aircraft structure, magnetic material 202 adheres to structures or coatings on the aircraft that are also magnetic in nature.

Referring now to FIGS. 1, 2 and 3, in some instances, certain aircraft surfaces and structures, for example, exhaust-washed hot edges 300 of aircraft 302 may be "hot" at the time that protection device 100 or 200 is applied thereto, for example, immediately post-flight. The high temperature surfaces may cause the protection device to melt. Accordingly, for protection of surfaces and structures having raised temperatures, a thermal protective layer 114 may be applied to protection device 100, 200 to prevent damage due to excessive heat.

In one embodiment, thermal protective layer 114 may be an externally applied fabric, such as a Nomex & Kevlar bidirectional weave, known as Aramid Fabric. The fabric may be adhered to protection device 100, 200 using a MIL-A-46146 adhesive, known as Dow Corning 3145 RTV.

It is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An apparatus configured to protect exposed structures on an aircraft comprising:
   a core having a J-shaped cross-section including a straight length and a crook, the crook being configured to wrap around an edge of the aircraft to protect the edge from maintenance-induced damage;
   an outer coating encapsulating the core;
   a flap secured to a portion of the outer coating covering the straight length, on a side of the straight length opposite the crook, the flap extending from the apparatus away from the crook; and
   a securing mechanism coupled to the flap at a location spaced from the core, the securing mechanism being configured to releasably secure the apparatus to the aircraft.

2. The apparatus of claim 1, wherein the core comprises an impact absorbing elastomeric foam body.

3. The apparatus of claim 2, wherein the impact absorbing elastomeric foam body comprises a thermoformed ethelyne vinyl acetate (EVA).

4. The apparatus of claim 1, wherein the core comprises a thickness of between about 0.25" and about 2."

5. The apparatus of claim 1, wherein the securing mechanism comprises a suction cup.

6. The apparatus of claim 1, wherein the securing mechanism comprises a magnetic material.

7. The apparatus of claim 1, wherein the outer coating comprises an impact resistant flexible material.

8. The apparatus of claim 1, wherein the outer coating comprises urethane.

9. The apparatus of claim 1, wherein the outer coating comprises a thickness of between about 0.01" and about 0.2".

10. The apparatus of claim 1, further comprising a thermal protective layer applied over the outer coating.

11. An apparatus configured to protect exposed structures on an aircraft comprising:

an impact absorbing elastomeric foam body having a J-shaped cross-section including a straight length and a crook, the crook being configured to wrap around an edge of the aircraft to protect the edge from maintenance-induced damage;

an outer coating encapsulating the impact absorbing elastomeric foam body;

a tab extending from the straight length away from the crook; and a suction cup coupled to the flap at a location spaced from the core, the suction cup being configured to releasably secure the apparatus to the aircraft.

12. The apparatus of claim 11, wherein the impact absorbing elastomeric foam body comprises a thermoformed ethelyne vinyl acetate (EVA).

13. The apparatus of claim 11, wherein the impact absorbing elastomeric foam body comprises a thickness of between about 0.25" and about 2."

14. The apparatus of claim 11, wherein the outer coating comprises urethane.

15. The apparatus of claim 11, wherein the outer coating comprises a thickness of between about 0.01" and about 0.2."

16. The apparatus of claim 11, further comprising a thermal protective layer applied over the outer coating.

17. The apparatus of claim 11, wherein the impact absorbing elastomeric foam body comprises a thickness of between about 0.25" and about 2" and the outer coating comprises a thickness of between about 0.01" and about 0.2."

* * * * *